Figure 1:
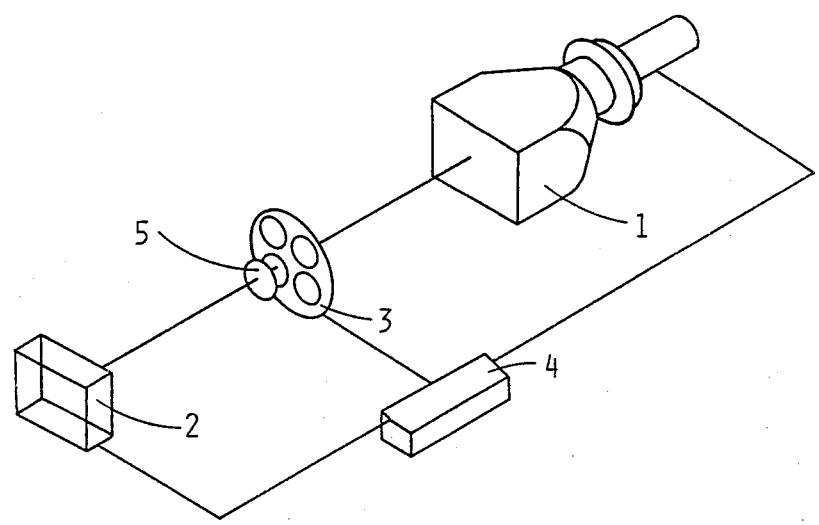

United States Patent [19]

Wittocx et al.

[11] Patent Number: 4,810,602
[45] Date of Patent: Mar. 7, 1989

[54] COLOR REPRODUCING METHOD AND APPARATUS

[75] Inventors: Guido R. Wittocx, Mortsel; Emile P. Schoeters, Lier, both of Belgium

[73] Assignee: Agfa-Gevaert, N.V., Mortsel, Belgium

[21] Appl. No.: 124,608

[22] Filed: Nov. 24, 1987

[30] Foreign Application Priority Data

Nov. 27, 1986 [EP] European Pat. Off. ........ 86202112.8

[51] Int. Cl.$^4$ .......................... G03C 5/04; G03C 5/54; G03C 7/00
[52] U.S. Cl. ...................................... 430/21; 430/236; 430/357; 430/358; 430/367; 355/20; 355/32; 355/35; 355/77
[58] Field of Search ................. 430/21, 357, 358, 367, 430/236, 235; 355/20, 32, 35, 77

[56] References Cited

U.S. PATENT DOCUMENTS 3,006,260  10/1961  Smith et al. ............................ 355/20
4,740,820   4/1988  Endo ..................................... 355/20

Primary Examiner—Richard L. Schilling
Attorney, Agent, or Firm—A. W. Breiner

[57] ABSTRACT

Method and apparatus for improving the perceptibility of details on a hard-copy of a color image and for matching the color of a displayed image and a color hard-copy of the same image. In addition to the recording of the color information, at least one white light exposure modulated by the information of at least one color separation record is performed.

5 Claims, 3 Drawing Sheets

COLOR REPRODUCING METHOD AND APPARATUS

DESCRIPTION

The present invention is in the field of colour reproduction. The invention in particulary relates to a method and an apparatus for improving the image quality of a hard-copy of a display of a colour image and for improving the colour-matching between a colour hard-copy of an image and a colour display of the same image.

It is known to represent a body of colour information by means of one or more video signals and to translate said video signal(s) into a colour hard-copy through the intermediary of a raster image display device such as a monitor. The hard-copy can for example be obtained through monitor photography i.e. by exposing a light-sensitive material in a photographic camera to the image that is displayed on the monitor screen.

In accordance with one example of prior art practice, a full colour image is separated into red (R), green (G) and blue (B) primary colour separations. The colour separation information is represented by a set of three video signals, one for each colour separation image. The video signals are in sequence applied to a black-and-white raster image display device such as a black-and-white monitor.

The hard-copy of the displayed information is obtained through monitor photography. A recording material, e.g. a light-sensitive silver halide colour material, is in sequence exposed to the displayed colour separation images of the colour image to be hard-copied. The recording material is e.g. a colour light-sensitive material.

The colour information on the recording material is obtained through subtractive mixing of primary colour components. Thereto the displayed separation images are projected onto the recording material through a corresponding colour filter.

Practice has learned that the number of individually discriminative density levels in a colour hard-copy of a body of colour information attained by the method as hitherto practised is often insufficient. As a consequence the perceptibility of details that are represented by local density variations in the recorded image may be inadequate for several applications.

Among these applications are business graphics, medical diagnostics on hard-copy images from raster displays etc. It will be clear that especially the last mentioned application requires an extremely high perceptibility of density variations on the hard-copy. Poor discrimination of said density variations has a negative influence on the perceptibility of details in the image, which might have very serious consequences on the medical diagnosis.

Since the human eye is least sensitive to wavelengths that are situated in the blue range of the visible spectrum, the above-described problems are most inconvenient in blue subparts of an image.

Another problem to be solved relates to colour-matching. In certain applications a colour image is inspected on a colour image display device while at the same time the video representation of said colour image is translated into a colour hard-copy through monitor photography. The colour information on a hard-copy that is obtained according to the above procedure, not always matches with the colour information of the displayed image due to the characteristics of the monitor, the characteristics of the used filters, the absorption and emission spectrum of the recording material.

For example, in the above mentioned medical diagnostics application, a first diagnosis is often performed on a colour display of an image before recording. The hard-copy image is used later on for the purpose of further, more detailed diagnosis and/or for archiving purposes. It will be clear that matching of the colours of the intermediate displayed colour image and the final recorded image is most desirable in order to minimize any possible confusion.

It is therefore an object of the present invention to overcome the above defects of the prior art method and of the apparatus for performing said method.

This object can be accomplished according to the present invention by providing a method of producing a hard-copy of a body of colour information wherein a colour recording material is exposed to colour separations of said image, characterised in that said recording material is additionally subjected to at least one white light exposure being modulated by the information of at least one of said colour separations. According to a particular embodiment of the present invention the full colour image is separated into red (R), green (G) and blue (B) primary colour separations. The colour separation information is represented by a set of three video signals, one for each colour separation image. Next, at least one additional white light exposure is performed, said white light exposure(s), however is (are) modulated by the information of at least one colour separation record.

The video signals representing the red, green and blue primary colour separations as well as the video signals representing the colour separation record(s) which modulate(s) the white light exposure(s), are in sequence applied to the monitor in order to display the corresponding partial images. The colour information on a colour recording material is obtained by projecting the displayed red, green and blue colour separation images through a corresponding colour filter. In addition the recording material is exposed to at least one modulated white light exposure by projecting the corresponding displayed image(s) through a neutral or through no filter.

Recording materials that are often used in the field of monitor photography are dye diffusion transfer materials. Dye diffusion transfer imaging can be carried out in a number of ways but all dye diffusion transfer systems are based on the same principle of modifying the solubility of the dyes as a function of the amount of photographic silver halide developed.

In commonly known dye diffusion transfer processes the dye-image-producing compounds are either initially mobile in alkaline aqueous media and become immobilized during processing, or initially immobile and become mobilized during processing.

A survey of such processes is given by Christian C. Van De Sande in Angew. Chem. - Int. Ed. Engl. 22 (1983) no. 3, 191-209.

The video representations of the body of colour information as well as of the colour separation images may be represented in an analog form as above described or may be represented by a set of digital bitmap forms. The bitmap forms are converted into analog signals before being fed to the electron gun(s) of the monitor.

Figure 2:
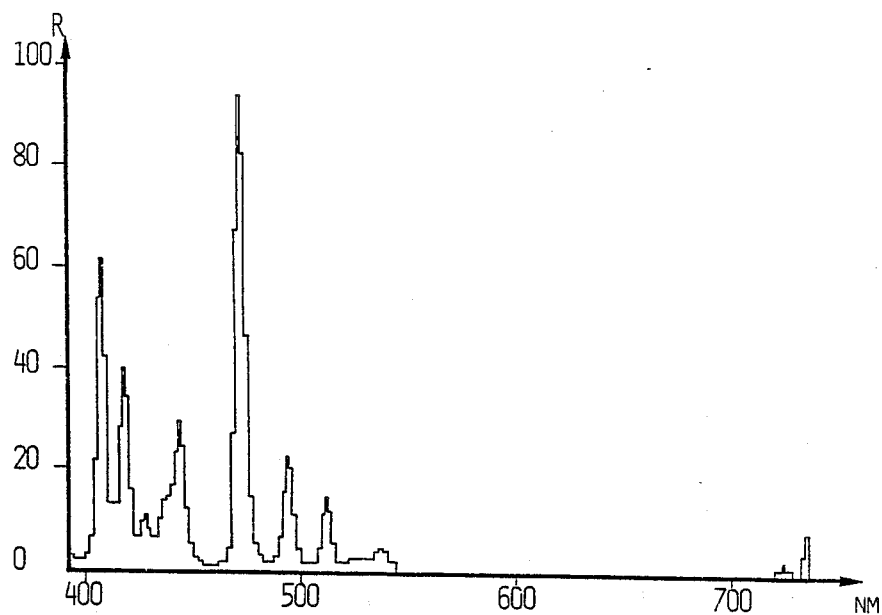
Figure 3:
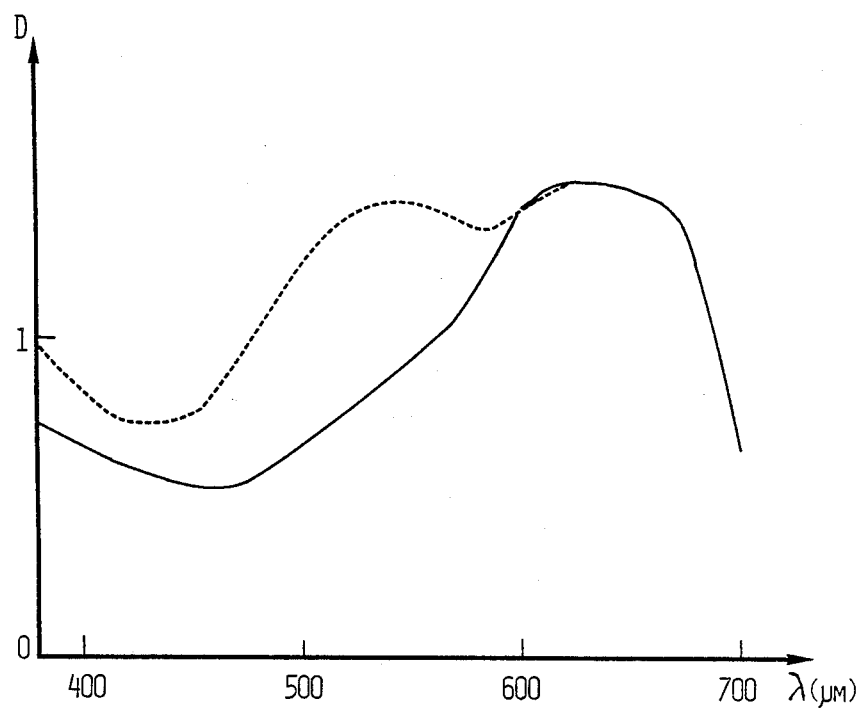
Figure 4:
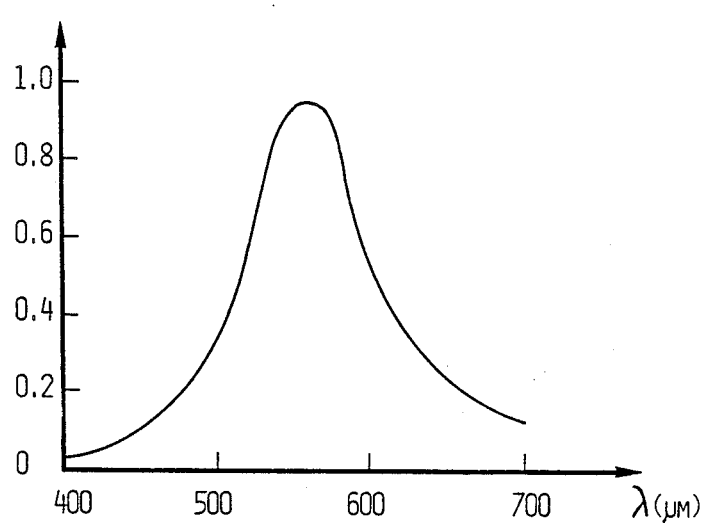
Figure 5:
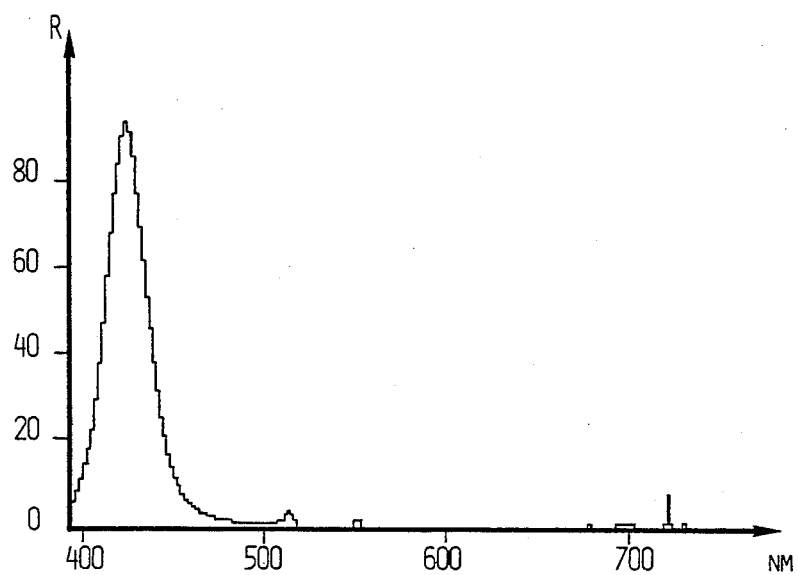
Figure 6:
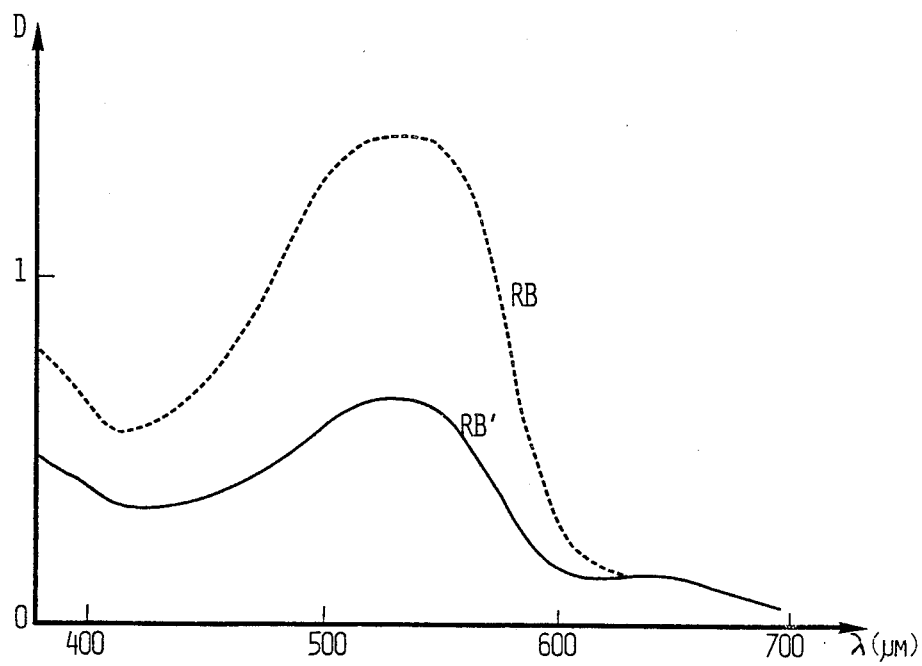

For a better understanding of the present invention reference is made to the following detailed description of the invention given in connection with the accompanying drawings, in which FIG. 1 diagrammatically shows the composition of an embodiment of a device for performing the method of the present invention, FIG. 2 is the emission spectrum of the phosphor of the colour monitor incorporated in the described particular embodiment of a device for performing the method of the present invention, FIG. 3 shows the reflection spectrum of a blue subpart of an image that has been recorded according to the prior art method and according to the method of the present invention, FIG. 4 shows the sensibility of the human eye versus the wavelength of the perceived light, FIG. 5 shows the spectrum of the blue channel of a colour monitor, FIG. 6 shows the reflection spectrum of an artificial cyan colour that is obtained by applying the method of the present invention.

A device by means of which the method in accordance with the present invention can be performed is schematically shown in FIG. 1. The device comprises a black-and-white monitor 1. The spectrum of the phosphor screen that is incorporated in the present monitor is shown in FIG. 2.

The device furthermore comprises a camera 2 which exposes a recording material to the image on the monitor and advances the recording material between frames.

A colour filter wheel 3 (comprising a red, green, blue and optionally a neutral filter) is positioned in between the monitor and the camera. One of the colour filters can be positioned in the optical path thus allowing the three primary colours to be extracted from the black-and-white image on the monitor.

The device may incorporate a micro-processor 4 to handle all kinds of control f.i. control of the input signals into the monitor, control of the transport of the recording material in the camera, movement of the filter wheel, power supply etc. The driving circuitry for the movement of the filter wheel and for the film movement in the camera, is not shown. The three colour separations R, G, and B of an image are represented by three bitmaps. These bitmaps are converted into analogue signals and are in sequence applied to the electron gun of the black-and-white monitor. The displayed images are projected through the corresponding colour filter that has been positioned in the optical path. A lens system 5 focuses the displayed images onto the recording material.

In accordance with the present invention, the projection of the colour separation images through the corresponding colour filters is followed by at least one white light exposure of the recording material modulated by the information of at least one colour separation record.

A white light exposure of the recording material is performed by directing the light that is emitted by the phosphor of the monitor through a neutral filter or by omitting a filter in the light path. For example, the bitmap corresponding with the blue colour separation image is once again fed into the monitor and the displayed partial image is projected onto the recording material through the neutral filter (or no filter).

By means of FIG. 3 and FIG. 4 the increased perceptibility that is obtained by applying the method of the present invention in comparison with the prior art method can be proved.

In FIG. 3, the dashed line shows the density of a blue coloured reproduction on a colour light-sensitive dye diffusion transfer material as a function of the wavelength. This curve is obtained through measurement of the diffuse reflection of said material.

The plain line illustrates the density as a function of the wavelength of the identical light-sensitive material that has been subjected to an exposure of the pixels of the blue colour separation through a blue filter, followed by an white light exposure modulated by the information of the same colour separation record.

The minimum of the reflection spectrum is in the first case found at 420 nanometer, while the minimum is in the second case found at 460 nanometer and hence is shifted by 40 nanometer relative to the minimum that was obtained by applying the prior art method.

The above shift of the minimum enhances the perceptibility of the blue colour since the minimum obtained by means of the double exposure according to the method of the present invention is shifted in the direction of increased perceptibility by the human eye as can be seen on FIG. 4.

FIG. 4 is a curve representing the eye sensitivity factor versus the wavelength. The eye sensitivity factor equals the ratio of the amount of light having a wavelength of 550 nanometer to the amount of light having a wavelength of which one seeks to determine the eye sensitivity factor. This curve gives an indication of the sensitivity of the human eye to light of a specific wavelength.

The minimum of the reflection spectrum that is measured on a light-sensitive recording material that has been exposed to a blue colour separation followed by a white light exposure modulated by the information of the blue colour separation record, is indicated by "B" (460 nonometer).

The minimum of the reflection spectrum that is measured on an identical light-sensitive material that has only been subjected to an exposure modulated by the blue colour separation information, being projected through a blue colour filter is indicated by "A" (420 nanometer).

The figure illustrates that the minimum "B", obtained by means of a double exposure according to the present invention, is shifted relative to the position of the minimum "A" in the direction of increasing sensibility of the human eye.

FIG. 5 shows the spectrum of the blue channel of a particular embodiment of a colour monitor.

The maximum of the emitted spectrum is situated at 450 nanometer. The minimum of the reflection spectrum that is measured on a dye diffusion transfer material that is subjected to an exposure which was modulated by the blue colour separation information, being projected through a blue colour filter, is found at 420 nanometer.

The present invention provides a method of matching the ultimate blue colour on the exposed light-sensitive material with the blue colour on the monitor. By performing on the recording material an additional white light exposure that is modulated by the information of the blue colour separation, the wavelength range of the ultimate blue colour on the light sensitive material is shifted so that it gets near to the colour of the blue channel of the colour monitor.

It will be obvious that this technique of colour matching is not limited to the blue colour.

By the same technique the spectrum of composite colours that are formed by mixing at least two primary colours, can be shifted in the direction of increased sensitivity of the human eye. This technique may furthermore improve the colour matching of an image display and a hard-copy of the same image.

FIG. 6 shows the reflection spectrum of an artificial magenta colour. This colour was formed on a dye diffusion transfer material. The selection images in correspondence with the red and the blue colour separations of the body of colour information to be hard-copied were displayed on a black-and-white monitor. The selection images were projected in sequence onto the recording material through a red or a blue colour filter.

An additional white light exposure of the recording material was performed. This white light exposure was modulated by the information of the blue colour separation record. The corresponding image was displayed on the black-and-white monitor and was projected onto the recording material through a neutral filter or was projected onto the recording material without the use of any filter in the light path. The reflection spectrum of this artificial magenta colour is indicated by RB'. In this figure the reflection spectrum of the magenta colour that was obtained by the prior art method (without the additional white light exposure), is furthermore shown and is indicated by RB.

This figure illustrates that when a spectrum on a hard-copy is not matched with the colour that are displayed by a display device, this spectrum can be influenced by means of at least one additional white light exposure which is modulated by the information of at least one colour separation.

The method of the present invention may be performed by means of a colour monitor. It will be clear to a person skilled in the art that additional and more complex electrical and/or electronic circuitry is to be provided in order to control the successive illuminations of the recording material.

It will be obvious that the invention is not limited to the described image display devices nor the described exposure system.

We claim:

1. A method of producing a hard-copy of a body of colour information representing an image wherein a colour recording material is exposed to colour separations of said image, characterised in that said recording material is additionally subjected to at least one white light exposure being modulated by the information of at least one of said color separations.

2. A method according to claim 1 wherein said colour separations comprises a red, green and blue colour separation of said image.

3. Method according to claim 1 wherein the colour separations are represented by a set of three video signals that are applied to a black-and-white monitor to be displayed and wherein the displayed images are projected onto a light-sensitive material through a red, green, blue, neutral filter or no filter.

4. Method according to claim 1 wherein the colour information is recorded through monitor photography on a dye diffusion transfer material.

5. Method according to claim 1 wherein said recording material is subjected to a white light exposure being modulated by the information of a blue colour separation record.

* * * * *